(12) United States Patent
Matheson

(10) Patent No.: US 7,569,807 B2
(45) Date of Patent: Aug. 4, 2009

(54) LIGHT SOURCE WITH PHOTOSENSOR LIGHT GUIDE

(75) Inventor: George E. Matheson, North Vancouver (CA)

(73) Assignee: Koninklijke Philips Electronics N.V., Eindhoven (NL)

( * ) Notice: Subject to any disclaimer, the term of this patent is extended or adjusted under 35 U.S.C. 154(b) by 99 days.

(21) Appl. No.: 11/842,612

(22) Filed: Aug. 21, 2007

(65) Prior Publication Data

US 2008/0048095 A1    Feb. 28, 2008

Related U.S. Application Data

(60) Provisional application No. 60/823,177, filed on Aug. 22, 2006.

(51) Int. Cl.
*G01J 1/04* (2006.01)
*G01J 1/32* (2006.01)

(52) U.S. Cl. ............ 250/227.11; 250/205; 385/12; 362/606; 362/612; 315/291

(58) Field of Classification Search ............ 250/205, 250/227.11, 227.24, 227.31; 385/9, 12, 31, 385/129; 362/606, 610–612, 615, 555; 315/307, 315/149, 291, 312
See application file for complete search history.

(56) References Cited

U.S. PATENT DOCUMENTS 6,753,661 B2 * 6/2004 Muthu et al. ............ 315/307
2005/0286831 A1 * 12/2005 Ohtsu et al. ............ 385/31

* cited by examiner

*Primary Examiner*—Kevin Pyo

(57) ABSTRACT

The present invention provides a light source comprising one or more light-emitting elements, one or more photosensors and, a photosensor light guide, such as, for example, a substantially planar light guide. The photosensor light guide is generally configured to capture and guide some of the light emitted from the one or more light-emitting elements to one or more photosensors optically coupled thereto, the light sensed thereby being useable as a basis for controlling the respective outputs of the one or more light-emitting elements.

24 Claims, 12 Drawing Sheets

LIGHT SOURCE WITH PHOTOSENSOR LIGHT GUIDE

CROSS-REFERENCE TO RELATED APPLICATIONS

This application claims the benefit of U.S. Provisional Application No. 60/823,177, filed on Aug. 22, 2006.

FIELD OF THE INVENTION

The present invention pertains to the field of lighting and in particular to a light source with a photosensor light guide.

BACKGROUND

Advances in the development and improvements of the luminous flux of light-emitting devices such as solid-state semiconductor and organic light-emitting diodes (LEDs) have made these devices suitable for use in general illumination applications, including architectural, entertainment, and roadway lighting. Light-emitting diodes are becoming increasingly competitive with light sources such as incandescent, fluorescent, and high-intensity discharge lamps. Also, with the increasing selection of LED wavelengths to choose from, white light and colour changing luminaires are becoming more popular. As such, there is an ever present need for improved control over the colour of light output by these luminaires.

In general, a white light or colour changing luminaire comprises different, single wavelength LEDs, such as red (R), green (G), blue (B) and optionally amber (A) LEDs. The colour of the light output by the luminaire can be changed and/or optimised by altering the relative intensities of these LEDs.

One difficulty generally associated with white light or colour changing luminaires, however, is that the output of each LED changes differently with changes in ambient and/or operating temperature. If the ratio of average driving currents in the LEDs is not changed to accommodate this situation, the combined output colour of the luminaire may change by an often perceivable, and generally undesired amount. Other factors that may affect the output colour may include ageing of the LEDs and the luminaire's output intensity.

Consequently, in order to achieve a stable output colour, that is an output colour that remains substantially the same despite ambient and/or device temperature changes, ageing of the LEDs, and/or variations in overall output intensity, it may be necessary to monitor the chromaticity of the combined LED outputs and provide feedback to a controller thereof, which controls the LEDs to substantially maintain a desired output colour. Such feedback control may also be applicable to substantially maintain a desired luminaire output luminosity, radiometric power, and the like, as well as maintain and/or optimise a luminaire's colour quality and/or colour rendering efficiency.

The following provide some examples of light sources having a feedback control system. For instance, in U.S. Pat. No. 6,964,500 a liquid crystal display apparatus is described as having red, green and blue LEDs directed and coupled into a light guide plate for evenly guiding and diffusing the LED light over a large output surface area of the plate via a diffusion portion having a printed microdot pattern. An optical sensor, coupled to a side surface of the light guide plate via a light-shielding member, is also provided for detecting light exiting from the light guide plate through this side surface, and controlling, based on this detected light, the luminance of the LEDs.

In U.S. Pat. No. 6,753,661, an apparatus and method for backlighting an electronic display is described as using LEDs and a feedback control microprocessor for controlling a luminosity, radiometric power, and colour levels of the apparatus, thereby maintaining a substantially constant white backlight level. A similar backlighting application is also described in the Philips Lumileds Lighting Company document entitled "LED Backlighting from Revolution to Reality", published Jun. 7, 2004 (http://www.lumileds.com/pdfs/tp39_us_fpd_2004.pdf), whereas the OSRAM Application Note on Light Guides, published Apr. 25, 2002 (http://catalog.osramos.com/media/_en/Graphics/00026784_0.pdf) provides some general guidelines regarding planar light guides as they relate to such backlighting applications.

Also, a luminaire comprising a feedback control system is described in U.S. Pat. No. 6,741,351, wherein a white light emitting LED luminaire combines an array of red, green and blue LEDs with a feedback arrangement configured to maintain a desired colour balance. The feedback arrangement includes photodiodes positioned to intercept reflected light from a partially reflecting element placed in the path of the combined output of the LED array. Alternatively, each LED has an associated photodiode, either incorporated into the LED package or in a separate package, to provide similar results.

In general, the above and other such currently available light sources have various drawbacks, namely with regards to the optical coupling of LED outputs to the sensor(s) of a feedback control system. For instance, unwanted ambient light may be incident on the sensor and cause errors in the feedback signal, light reaching the sensor(s) may not be sufficient to provide an adequate feedback signal, the respective contributions of the LEDs may not be sufficiently balanced and/or the sensor(s) may obscure part of the light source's output.

Consequently, there is a need for a light source that overcomes some of the drawbacks of known light sources.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a light source with a photosensor light guide. In accordance with an aspect of the present invention, there is provided a light source comprising: a substantially planar light guide comprising one or more in-coupling portions and one or more out-coupling portions; one or more light-emitting elements, each configured to emit light about a respective optical axis and disposed such that an axial component thereof is at least partially directed toward the output of the light source and such that a radial component thereof is at least partially coupled into said substantially planar light guide via said one or more in-coupling portions; and one or more photosensors optically coupled to said one or more out-coupling portions for use in controlling the output of each of said one or more light-emitting elements based on out-coupled light sensed thereby.

In accordance with another aspect of the present invention, there is provided a light source comprising: one or more light-emitting elements; a substantially planar light guide comprising one or more in-coupling portions and one or more out-coupling portions, said substantially planar light guide being configured to capture stray light emitted from said one or more light-emitting elements via said one or more in-coupling portions; and one or more photosensors optically coupled to said one or more out-coupling portions for use in controlling the output of each of said one or more light-emitting elements based on out-coupled light sensed thereby.

DETAILED DESCRIPTION OF THE INVENTION

Definitions

Figure 1:
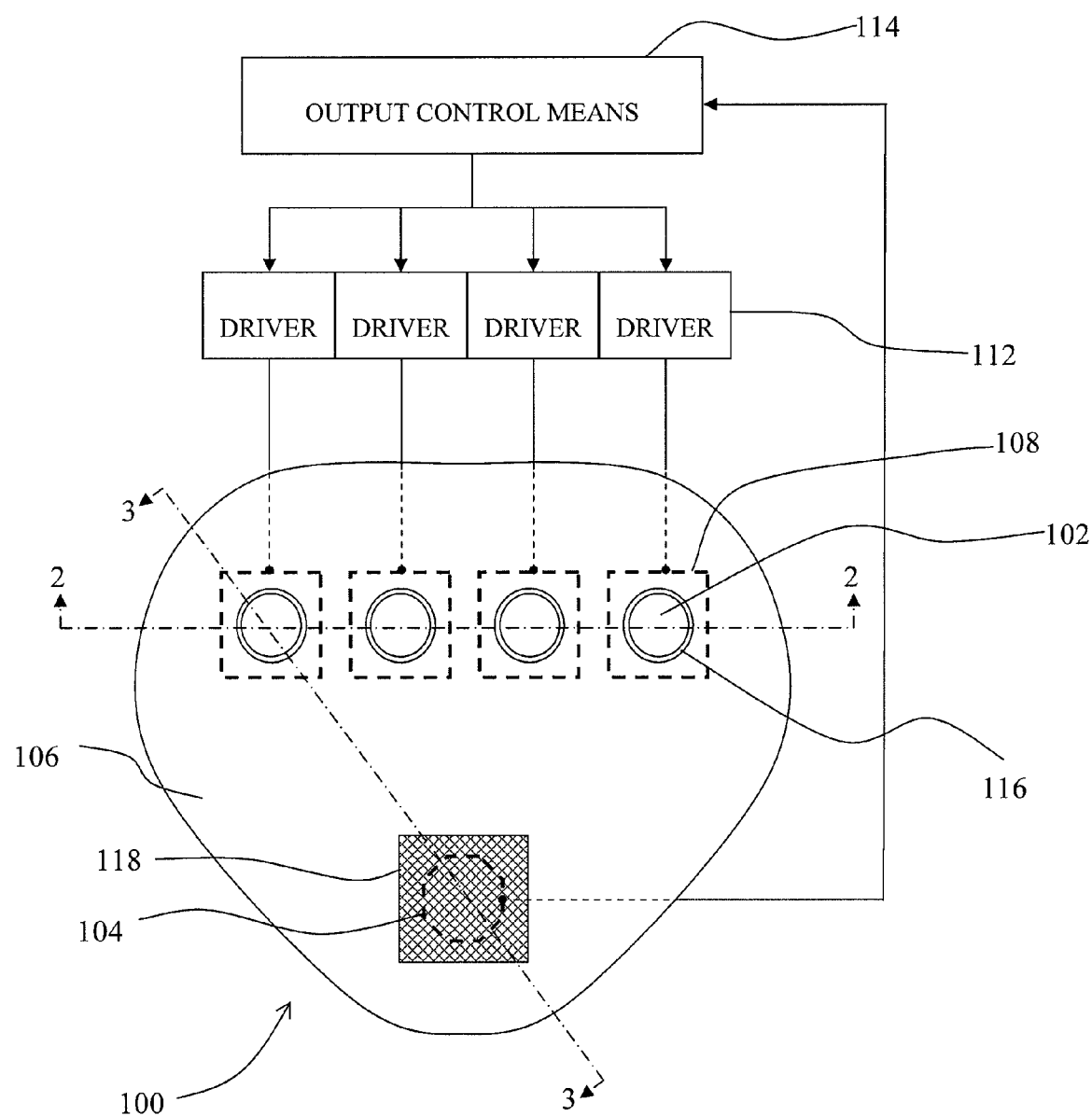
FIG. 1 is a top plan view of a light source comprising a photosensor light guide, in accordance with one embodiment of the present invention.

The term "light-emitting element" is used to define a device that emits radiation in a region or combination of regions of the electromagnetic spectrum for example, the visible region, infrared and/or ultraviolet region, when activated by applying a potential difference across it or passing a current through it, for example. Therefore a light-emitting element can have monochromatic, quasi-monochromatic, polychromatic or broadband spectral emission characteristics. Examples of light-emitting elements include semiconductor, organic, or polymer/polymeric light-emitting diodes, optically pumped phosphor coated light-emitting diodes, optically pumped nano-crystal light-emitting diodes or other similar devices as would be readily understood by a worker skilled in the art. Furthermore, the term light-emitting element is used to define the specific device that emits the radiation, for example a LED die, and can equally be used to define a combination of the specific device that emits the radiation together with a housing or package within which the specific device or devices are placed.

The term "substantially planar light guide" is used to define a light guide generally configured to guide light over a 2D surface. For instance, a substantially planar light guide may include a slab light guide or waveguide, a flat light guide or waveguide, a surface light guide or waveguide, or other similar light or wave-guiding structures as would be readily understood by the worker skilled in the art. The term "substantially planar light guide" is further considered to include different 2D light guides or waveguides, of different shapes or forms, whether it is flat, or exhibiting a curvature or roundness not prohibitively affecting the light or wave-guiding characteristics thereof.

The term "in-coupling portion" is used to define a portion of a photosensor light guide through which light may be "captured" and/or "in-coupled" so as to be guided therein. An in-coupling portion is configured to primarily allow light to enter the light guide, however under some circumstances some light may exit the light guide via an in-coupling portion. An in-coupling portion will be readily understood by the worker skilled in the art to include an "in-coupling edge portion", such as an outer edge of the light guide or an inner edge machined therein, for example, to produce variously shaped apertures, holes, trenches and the like within the light guide. An in-coupling edge portion may be flat, that is substantially perpendicular to the main surface of the light guide, curved, angled and/or coated as needed to provide desired in-coupling characteristics. It will also be understood that an in-coupling portion may also include an "in-coupling surface portion", such as a surface portion conditioned to in-couple light incident on this portion of the light guide. For instance, an in-coupling surface portion may be identified by a portion of the light guide having a surface that has been, for example, roughened, textured, machined and/or imprinted to act as a diffuser, thereby allowing light interacting with this portion to be coupled into the light guide.

The term "out-coupling portion" is used to define a portion of a photosensor light guide through which light may be "extracted" and/or "out-coupled" from the light guide. An out-coupling portion is configured to primarily allow light to exit the light guide, however under some circumstances some light may enter the light guide via an out-coupling portion. An out-coupling portion will be readily understood by the worker skilled in the art to include an "out-coupling edge portion", such as an outer edge of the light guide or an inner edge machined therein, for example, to produce variously shaped apertures, holes, trenches and the like within the light guide. An out-coupling edge portion may be flat, that is substantially perpendicular to the main surface of the light guide, curved, angled and/or coated as needed to provide desired out-coupling characteristics. It will also be understood that an out-coupling portion may also include an "out-coupling surface portion", such as a surface portion conditioned to out-couple light guided within the light guide. For instance, an out-coupling surface portion may be identified by a portion of the light guide having a surface that has been, for example, roughened, textured, machined and/or imprinted to act as a diffuser, thereby allowing light interacting with this portion from within the light guide to be extracted from the light guide. Other such out-coupling techniques should be readily understood by the worker skilled in the art and are thus not meant to be excluded from the present definition.

The term "stray light" is used to define light output from a given light-emitting element that is not generally considered to partake in the overall output of a light source comprising the given light-emitting element. For instance, even though a light-emitting element may be configured to emit light in a predetermined direction, and that light emitted in this predetermined direction may generally be used, optionally via various output optical arrangements, to provide a general output for the light source, additional light may still be emitted in other directions. In general, this additional light is not particularly significant in the overall light source output design. One example of stray light may include light emitted from the sides of a light-emitting element that is nominally forward-emitting (i.e., radially emitted light from a light-emitting element having a substantially predominant axial emission component). Alternatively, or in combination therewith, stray light may include a back scattered or reflected light component directed axially and/or radially away from a predominant output direction of the light-emitting element (e.g. internal reflections within light-emitting element package, back scattering off impurities, package components and/or localised refractive index variations such as bubble/gas trapped within light emitting element encapsulation material, defects in the output lens, etc.). Other such examples should be readily apparent to the worker skilled in the art. In general, stray light is used to define a component of the light emitted by a given light-emitting element that is at most secondary relative to a predominant emission component, namely the component predominantly used to provide the desired output of the light source comprising the given light-emitting element.

As used herein, the term "about" refers to a +/−10% variation from the nominal value. It is to be understood that such a variation is always included in any given value provided herein, whether or not it is specifically referred to.

Unless defined otherwise, all technical and scientific terms used herein have the same meaning as commonly understood by one of ordinary skill in the art to which this invention belongs.

The present invention provides a light source with a photosensor light guide. In particular, the present invention provides a light source comprising one or more light-emitting elements, one or more photosensors and, a photosensor light guide, such as, for example, a substantially planar light guide. The photosensor light guide is generally configured to capture and guide some of the light emitted by the one or more light-emitting elements to one or more photosensors optically coupled thereto, the light sensed thereby being useable as a basis for controlling the respective outputs of the one or more light-emitting elements.

In general, the light-emitting elements are disposed in the light source such that a significant fraction and/or predominant component of each light-emitting element's emissions is directed to the light source's output, whereas a smaller fraction and/or at most secondary component of each light-emitting element's emissions is coupled into a photosensor light guide, for instance a substantially planar light guide, via one or more in-coupling portions thereof. Light coupled into the photosensor light guide may then be guided to one or more out-coupling portions of the light guide where it may be sensed by one or more photosensors optically coupled thereto. In general, the sensed light may be used as a basis for controlling the outputs of the one or more light-emitting elements, for example, to substantially maintain a desired light source output.

Optionally, the light source may further comprise a light guide cover or the like. This light guide cover may be disposed in relation to the light guide, for example, in order to promote light-guiding properties of the light guide, and/or reduce penetration of parasitic light, such as ambient and/or unwanted scattered light, from entering the light guide and affecting readings at the one or more photosensors. Examples of light guide covers, which will be discussed further below, may include, but are not limited to, one or more substantially opaque structures (e.g. cover plate or the like made of plastic, metal, etc.) and/or one or more layered coatings, such as reflective and/or opaque optical coatings painted, deposited and/or otherwise disposed on one or more surfaces of the light guide.

Light-Emitting Element(s)

The light source generally comprises one or more light-emitting elements. As defined above, the one or more light-emitting elements may optionally comprise a light-emitting element package comprising, in various combinations, a housing, an output optics (e.g., a lens such as a hemispherical lens, a filter, a coating, etc.), a drive circuitry and the like. In one embodiment, a light-emitting element is mounted to the light source via a substrate operatively coupled to a drive circuitry configured to drive the light-emitting element. For instance, a light-emitting element may be driven via a printed circuit board (PCB) or the like, which may either be specifically configured for driving a single light-emitting element, or configured for driving a group or array of light-emitting elements connected in various serial and/or parallel configurations.

In one embodiment, each light-emitting element is generally configured to emit light in a forward direction, namely in a direction along the optical axis of the light-emitting element, or of a package thereof. Light emitted by such light-emitting elements generally comprises a significant axial component and a lesser radial component. For instance, a majority of the light emitted by these light-emitting elements is generally concentrated within a solid angle around the optical axis of the light-emitting element and/or package, whereas only a minor fraction of the light is emitted radially or sideways.

In one embodiment, these radial or sideways emissions comprise stray emissions not particularly significant relative to the overall output of the light-emitting element and, of generally limited contribution to the overall output of the light source. The stray light may however be used to monitor an output of the one or more light-emitting elements, namely by coupling this stray light into a photosensor light guide. In one embodiment, unwanted and/or stray light emitted radially and/or from the side of a light-emitting element is coupled into a substantially planar light guide for downstream detection. Stray light emitted by several different light-emitting elements may be combined within the substantially planar light guide and guided to a single photosensor, or to more than one photosensor (e.g., different photosensors configured to detect light having different colour components, etc.).

In another embodiment, the light source's one or more light-emitting elements are each configured to emit light about a respective optical axis and disposed such that an axial component thereof is directed toward the output of the light source and such that a radial component thereof is directed toward the one or more in-coupling portions of the photosensor light guide.

In another embodiment, the one or more light-emitting elements are configured such that stray light emitted therefrom is directed toward the one or more in-coupling portions of the photosensor light guide. Such stray light may include, as defined above, one or more at most secondary components of the light-emitting elements emissions that are not predominantly used for the light source output, such as for example, radial, back scattered and/or internally reflected light emitted by a predominantly axial and/or forward emitting light-emitting element, etc.

In another embodiment, the one or more light-emitting elements are configured such that a minor fraction and/or at most secondary component of the light emitted therefrom is directed toward the one or more in-coupling portions of the photosensor light guide, whereas a major fraction and/or predominant component of the light emitted therefrom is directed toward the output of the light source.

A person of skill in the art will readily understand that other similar light source configurations may be considered to be within the present context. Namely, various embodiments of a light source comprising one or more light-emitting elements configured to emit light both toward an output of the light source and, toward an in-coupling portion of a photosensor light guide to be guided therein for downstream detection, may be considered to be within the present context without departing from the general scope and nature of the present disclosure.

Furthermore, in one embodiment, the one or more light-emitting elements comprise one or more individual light-emitting elements, each one of which have a respective emission spectrum or colour. These may include different types of high brightness and/or high intensity light-emitting elements, and/or other types of standard and/or regular intensity light-emitting elements. In one such embodiment, the light source comprises three light-emitting elements consisting of a red light-emitting element, a green light-emitting element and a blue light-emitting element, the combined outputs of which being controllable to provide a desired coloured or white light output. In another such embodiment, the light source comprises four light-emitting elements consisting of a red light-emitting element, an amber light-emitting element, a green light-emitting element and a blue light-emitting element, the combined outputs of which again being controllable to provide a desired coloured or white light output. Other such colour combinations would be apparent to a worker skilled in the art.

In another embodiment, the one or more light-emitting elements comprise one or more groups or arrays of light emitting elements, each group or array having a respective emission spectrum or colour. These one or more groups or arrays may include different types of high brightness and/or high intensity light-emitting elements, and/or other types of standard and/or regular intensity light-emitting elements. In one such embodiment, the light source comprises three groups or arrays of light-emitting elements consisting of a group or array of red light-emitting elements, a group or array of green light-emitting elements and a group or array of blue light-emitting elements, the combined outputs of which being controllable to provide a desired coloured or white light output. In another such embodiment, the light source comprises four groups or arrays of light-emitting elements consisting of a group or array of red light-emitting elements, a group or array of amber light-emitting elements, a group or array of green light-emitting elements and a group or array of blue light-emitting elements, the combined outputs of which being controllable to provide a desired coloured or white light output. Other such colour combinations would be apparent to a worker skilled in the art.

Photosensor Light Guide

The light source includes a photosensor light guide comprising one or more in-coupling portions for capturing a fraction of the light emitted by the one or more light-emitting elements and, one or more out-coupling portions for extracting at least some of this fraction of the light to be sensed by the one or more photosensors optically coupled thereto. In one embodiment, the photosensor light guide is a substantially planar light guide.

As defined above, the one or more in-coupling portions may comprise, in different combinations, one or more in-coupling edge portions and/or one or more in-coupling surface portions. Likewise, the one or more out-coupling portions may comprise, in different combinations, one or more out-coupling edge portions and/or one or more out-coupling surface portions.

In general, the photosensor light guide may comprise a single in-coupling portion for in-coupling light emitted by all or subgroups of the one or more light-emitting elements, or may comprise a respective in-coupling portion for each of the one or more light-emitting elements. For example, in one embodiment, the light guide comprises three in-coupling portions, one for each of the light source's three light-emitting elements (e.g., an RGB light source). In another embodiment, the light guide comprises four in-coupling portions, one for each of the light source's four light-emitting elements (e.g., an RAGB light source).

In another embodiment, a particular in-coupling portion may be configured to in-couple light emitted by two or more light-emitting elements. For example, one such embodiment could symmetrically position two or more light-emitting elements within an aperture of the light guide, an edge thereof providing an in-coupling edge portion via which light from the two or more light-emitting elements may be symmetrically in-coupled to the light guide. Examples of such multi-element configurations may include, two light-emitting elements symmetrically disposed within an oval aperture, three light-emitting elements symmetrically disposed within a triangular aperture, four light-emitting elements symmetrically disposed within a square or rectangular aperture, and other such configurations readily understood by a worker skilled in the art.

Similarly, the photosensor light guide may comprise a single out-coupling portion for directing light to all or subgroups of the one or more photosensors, or may comprise a respective out-coupling portion for each of the one or more photosensors. For example, in one embodiment, the light guide comprises three out-coupling portions, one for each of the light source's three photosensors (e.g., photosensors respectively configured to sense red, green and blue light in a RGB light source). In another embodiment, the light guide comprises four out-coupling portions, one for each of the light source's four photosensors (e.g., photosensors respectively configured to sense red, amber, green and blue light in a RAGB light source). Alternatively, a particular out-coupling portion may be configured to direct light toward two or more photosensors.

In another embodiment, a single photosensor is provided to sense light emitted by all of the light source's one or more light-emitting elements. In this embodiment, light in-coupled from the one or more light-emitting elements is mixed and guided toward a single out-coupling portion, the photosensor being configured to sense the mixed light, which may again comprise, for example, combinations of red, green and blue light, red, amber, green and blue light, and other such colour combinations.

In general, total internal reflections occur inside the light guide to effectively mix the light in-coupled from the different light-emitting elements, and guide at least some of the mixed light toward the one or more photosensors. In one embodiment, the light-emitting elements, and in-coupling portions associated therewith, are substantially symmetrically disposed about the one or more out-coupling portions such that light guided thereto travels a substantially same distance irrespective of the light-emitting element from which it was emitted. Various encircling configurations, which may include, but are not limited to having two or more light emitting elements symmetrically disposed around one or more centrally-disposed photosensors, may be used to provide this characteristic.

In another embodiment, the light-emitting elements, and in-coupling portions associated therewith, are not symmetrically disposed about the one or more photosensors. By effective mixing of the light emitted by these light-emitting elements, for instance via guided travel within a substantially planar light guide, adequate light detection can be provided, thereby reducing spatial constraints associated with symmetric configurations. Examples of such configurations may include a linear array of light-emitting elements disposed at a distance form a single photosensor, and other such configurations readily apparent to the worker skilled in the art.

In one embodiment, the photosensor light guide comprises a substantially planar light guide shaped and sized such that a perimeter thereof encompasses the light source's one or more light-emitting elements and one or more photosensors. Respective apertures, positioned to correspond and be aligned with the positions of the one or more light-emitting elements, are provided in the light guide, the apertures being sufficiently large to fit over the optics of the respective light-emitting elements. As such, when the light guide is positioned over the one or more light-emitting elements, an inner edge of the apertures thereby defines respective in-coupling edge portions for in-coupling light emitted radially or sideways from the respective light-emitting elements, while a substantially forward emission thereof remains substantially unobstructed by the light guide. Such a configuration may be used, for example, to sample radially or sideways emitted light from the one or more light-emitting elements, which may comprise stray light, or a component of the emissions of the one or more light-emitting elements that is not needed or wanted to produce a desired light source output.

The photosensor light guide can be fabricated from one more of a plurality of materials, such that the material provides a desired level of light reflection therein, while additionally providing a desired level of light transmission therethrough. For example, the photosensor light guide can be fabricated from plastic, acrylic, glass or other material as would be readily understood by a worker skilled in the art.

In one embodiment, the light guide comprises an acrylic plate that is thin enough that it does not diminish the forward emitted light from the one or more light-emitting elements. It is positioned such that it captures the stray, sideways emitted light which would not normally be part of the useful output of the light source. In one embodiment, the acrylic plate is about 0.040" thick.

In another embodiment, the one or more in-coupling edge portions are defined within an outer edge of the substantially planar light guide. In one embodiment, such outer edge portions partially surround or encircle the one or more light-emitting elements.

Furthermore, in one embodiment, the light guide generally comprises respective out-coupling surface portions positioned to correspond and be aligned with the positions of the one or more photosensors. As such, at least some of the light captured from the one or more light-emitting elements may be mixed and guided by the light guide to the one or more out-coupling surface portions and extracted thereat to be sensed by a respective photosensor.

As defined above, the one or more out-coupling surface portions may each comprise, for example, a surface portion of the light guide that has been roughened, textured, machined and/or imprinted to redirect the light within the light guide towards the one or more photosensors. Such surface portions may be provided, for instance, on a surface of the light guide facing the photosensor, or on a surface opposed thereto. Furthermore, the one or more photosensors may be positioned on either side of the light guide. Other such light extraction methods and configurations should be apparent to the person of skill in the art and are thus not meant to depart from the general scope and nature of the present disclosure.

In another embodiment, the one or more photosensors may be coupled to out-coupling edge portions either defined by inner edge portions of the light guide (e.g., inner edge of an aperture/hole within the light guide), or by an outer edge thereof.

In addition, the worker skilled in the art will understand that the photosensor light guide may be manufactured to have different shapes or forms appropriate for guiding light from a one or more light-emitting elements to the one or more photosensors. For instance, a substantially planar light guide may be shaped and sized to accommodate the structural constraints of the light source, namely defined by an application for which it is used, and/or to accommodate various light-emitting element and photosensor configurations deemed to provide satisfactory or optimised results (e.g., see FIGS. 1 and 6 to 8).

For example, in one embodiment, the photosensor light guide is defined by a substantially planar light guide having a partly parabolic shape such that the one or more photosensors may be positioned at a focal point thereof and such that light emitted from the one or more light-emitting elements may be reflected from the edges of the light guide towards this focal point. Other such focusing configurations should be apparent to the person of skill in the art.

Alternatively, the photosensor light guide may be shaped to accommodate a substantially symmetrical disposition of the one or more light-emitting elements relative to the one or more photosensors. Circular, oblong, square, triangular and other such shapes may be considered, as should be readily apparent to the person of skill in the art. Irregular shapes, namely conceived to accommodate irregular light sources and/or not particularly symmetric light-emitting element and photosensor configurations may also be considered without departing from the general scope and nature of the present disclosure.

Furthermore, the photosensor light guide may be coated and/or fitted with additional optical elements to enhance an output of the light source and/or enhance its light in-coupling, out-coupling and/or guiding properties. For instance, in one embodiment, the top surface of a substantially planar light guide may be silvered or coated with some other reflective material to reduce an amount of ambient light entering the light guide while also helping to reflect light emitted from the one or more light-emitting elements out of the light source.

Figure 13:
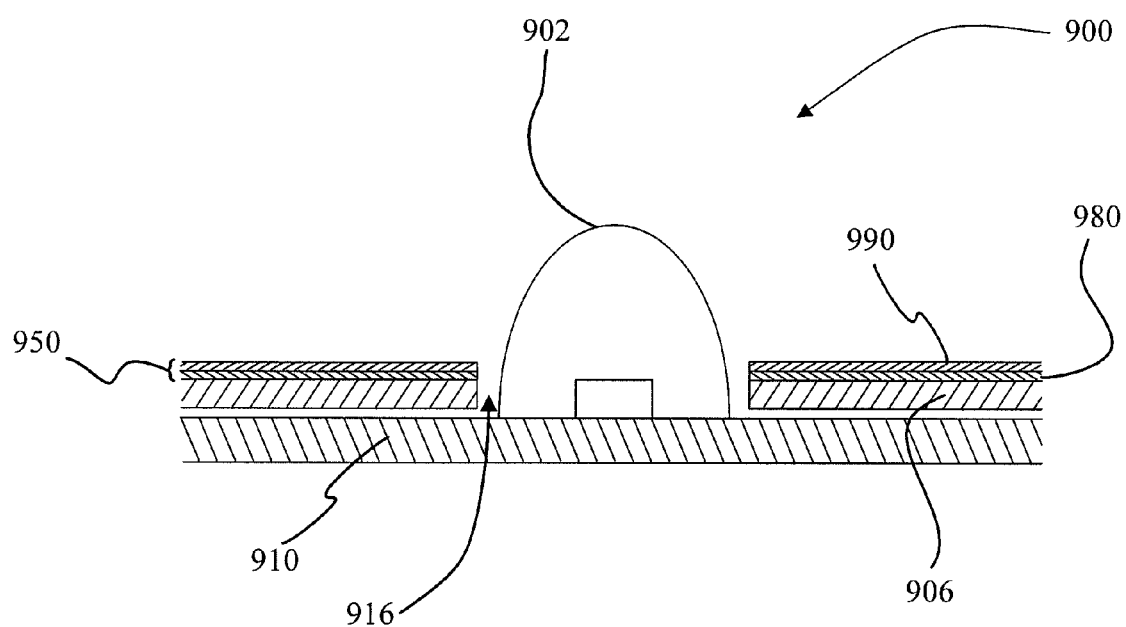
FIG. 13 is a cross section of a portion of a light source comprising a photosensor light guide and layered light guide cover coating, in accordance with another embodiment of the present invention.

In addition, the top surface of a substantially planar light guide which is silvered or coated with some other reflective material, may, in some embodiments, also have a substantially opaque topcoat over the reflective coating, see FIG. 13 for example. The topcoat of such embodiments could, for example, at least partially block ambient light which could otherwise cause the sensor to detect more light than that intended as provided by the in-coupled component of each of the one or more light-emitting elements, and/or change the colour temperature and/or spectral distribution being read by the sensor, for example. The source of undesirable ambient light could include, for example, light provided via preferential scatter in the light source and/or from light entering from outside the light source, such as daylight and/or light generated by adjacent luminaries, or the like.

In some embodiments, a reflective coating is provided atop the light guide which blocks up to about 95% of ambient light. In such embodiments, an additional opaque coating may be provide atop the reflective coating to further reduce light from entering the light guide such that even more ambient light may be blocked from entering the light guide, in one embodiment blocking over 95% of ambient light. Such combinations of one or more layered coatings may thus provide, as an option, an effective photosensor light guide cover, as will be discussed in greater detail below.

Photosensor(s)

The light source comprises one or more photosensors optically coupled to the one or more out-coupling portions of the light source's photosensor light guide. The one or more photosensors are generally used for monitoring an output of the light source's one or more light-emitting elements, the sensed signals generally being used as part of an output controller and/or control system, described below, for substantially maintaining a desired light source output.

In general, one or more photosensors may be used. In one embodiment, the outputs of each of the one or more light-emitting elements is monitored via a single photosensor. In another embodiment, a separate photosensor is used for each type of light-emitting element, for example, for each colour in a multicolour light source.

In one embodiment, the one or more photosensors are optically coupled to one or more out-coupling surface portions of the photosensor light guide. In another embodiment, the one or more photosensors are optically coupled to one or more out-coupling edge portions of the photosensor light guide.

In one embodiment, the one or more photosensors are mounted within the light source on respective PCBs. In another embodiment, at least some of the one or more photosensors are mounted on a same PCB as one or more of the one or more light-emitting elements.

A photosensor can include different types of optical sensors which provide a means for converting detected light emissions into an electrical signal, wherein the photosensor can be a broadband sensor or a narrow band sensor. For example a photosensor can be a phototransistor, photosensor integrated circuit, unenergized LED, a silicon photodiode, or other device as would be readily understood by a worker skilled in the art. In one embodiment, a broadband sensor is mated with a filter, which can thereby provide a narrow band of light emission detection.

Output Control

In general, the light source comprises one or more light-emitting elements, the output of which contributing to the overall optical output of the light source. By monitoring the output of each of the one or more light-emitting elements, a controlled light source output may be achieved. For instance, various output parameters that may be considered for control include, but are not limited to, a radiometric output power, an output luminosity, and the like, as well as a chromaticity, a colour quality and/or a colour rendering efficiency of the light source. Other such parameters should be apparent to the person of skill in the art and are thus not meant to depart from the general scope and nature of the present disclosure.

As presented above, the light source comprises one or more photosensors configured to monitor, via the photosensor light guide, the output of the one or more light-emitting elements.

In general, the one or more photosensors are configured to generate electrical signals representative of the one or more light-emitting elements' respective outputs, which may then be used by a controller such as a signal processor of a control system (e.g., controller, microcontroller, software and/or hardware device, etc.) or other such control means to assess an output of the light source and adjust, when needed, the respective outputs of the one or more light-emitting elements.

In one embodiment, the light source comprises two or more light-emitting elements, or groups or arrays thereof, each generally having a respective emission spectrum. By combining the outputs of the two or more light-emitting elements, a combined light source output spectrum or colour is provided, this output spectrum or colour being generally determined by the relative spectral contributions of each light-emitting element. As such, by controlling the respective intensities of the two or more light-emitting elements, an overall output spectrum or colour of the light source is also controlled.

In another embodiment, the light source comprises three or more light-emitting elements, or groups or arrays thereof, each generally having a respective emission spectrum. Again, by combining the outputs of the three or more light-emitting elements, a combined output spectrum or colour is provided, which may include white light. The person of skill in the art will readily understand that white light may also be generated using alternative means, such as using phosphor coated light-emitting elements and the like, and that such alternative means may also be considered in the present context.

In one embodiment, the light source comprises red (R), green (G) and blue (B) light-emitting elements configured to provide a controllable white or coloured output. In another embodiment, the light source comprises red (R), amber (A), green (G) and blue (B) light-emitting elements configured to provide a controllable white or coloured output. Alternatively, other combinations of two, three, four or more light-emitting elements, or groups or arrays thereof, each having respective emission spectra combinable to provide a selected, variable and/or optimised white or coloured output, may also be considered without departing from the general scope and nature of the present disclosure.

As stated above, the colour of the light source output can be changed and/or optimised by altering the relative intensities of the light-emitting elements (e.g., RGB, RAGB, etc.). Consequently by monitoring the output of the light source and/or of each light-emitting element, or group or array thereof, the output of the light source may be controlled. Furthermore, since the output of each light-emitting element may change differently with changes in ambient and/or operating temperature, or again with ageing of the light-emitting elements or changes in an output intensity thereof (e.g., luminous efficacy, colour, spectral shape, etc.), the output of the light source and/or of each light-emitting element, or group or array thereof, may further be monitored to detect such changes and provide adequate compensation to substantially maintain a desired output.

Consequently, in one embodiment, in order to achieve a substantially stable output colour, that is an output colour that remains substantially the same despite ambient and/or device temperature changes, ageing of the light-emitting elements, and/or variations in overall output intensity, the chromaticity of the combined light-emitting element outputs is monitored via the photosensor light guide and one or more photosensors coupled thereto. Signals generated by the one or more photosensors may be used to provide feedback to a light source or system controller, which generally controls the light-emitting elements (e.g., via respective drivers and/or control circuitry) to substantially maintain a desired output colour. Such feedback control may also be applicable, in various embodiments, to substantially maintain a desired output luminosity, a radiometric power, as well as maintain and/or optimise a colour quality and/or colour rendering efficiency of the light source.

Optional Photosensor Light Guide Cover

The light source of the present invention may optionally comprise a light guide cover, for example, to block ambient light from entering the light guide and/or to promote the light-guiding properties of the light guide.

In one embodiment, the cover is substantially opaque and is disposed to promote the total internal reflection characteristics of the light guide and/or avoid undesirable light extraction therefrom. For example, the optional cover can be formed from a substantially opaque material (e.g. plastic, metal, etc.), or a transparent material coated to be opaque or reflective using techniques that should be apparent to the person of skill in the art. In another example, the light cover is comprised of one or more layered coatings disposed directly on the light guide, for example comprising a reflective coating disposed on a surface of the light guide and an additional substantially opaque coating disposed over the reflective coating to further reduce penetration of ambient light into the light guide.

In one embodiment, in order to promote the total internal reflection characteristics of the light guide, the cover is disposed so as not to be in direct optical contact with the light guide surface. For example, the light guide cover may be manufactured of a substantially opaque material and configured to be mounted within the light source in proximity to the light guide but distanced therefrom to avoid direct contact therebetween (e.g. see embodiment of FIG. 11.

In another embodiment, the surface of the cover facing the light guide, and/or the surface of the light guide facing the cover, is a reflective surface. As a result, the cover may be disposed in direct optical contact with the light guide surface (i.e. via the reflective coating) without adversely affecting the total internal reflection characteristics of the light guide.

Figure 11:
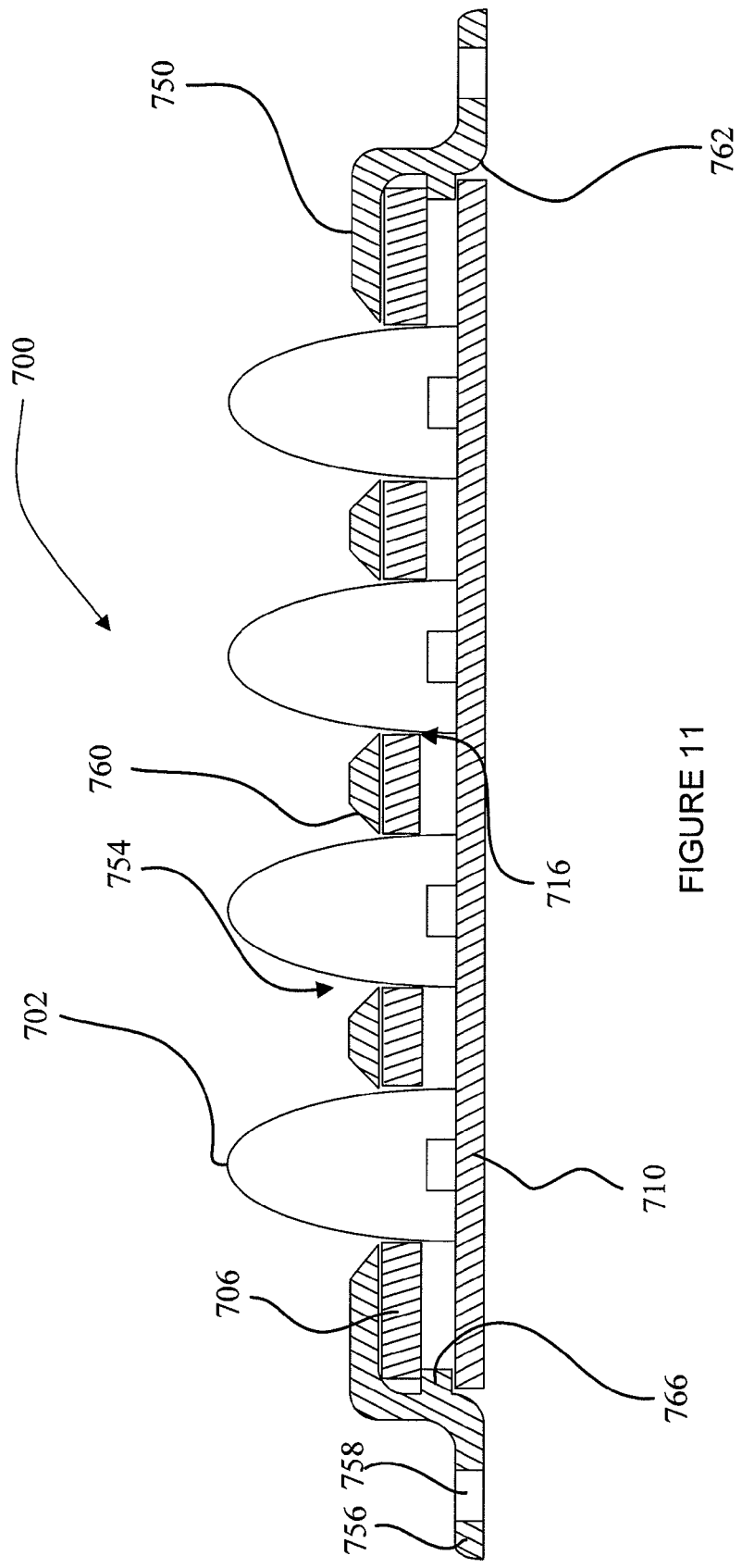
FIG. 11 is a cross section of a light source comprising a photosensor light guide and the light guide cover of FIG. 9, the cross section taken along line B-B thereof.
Figure 12:
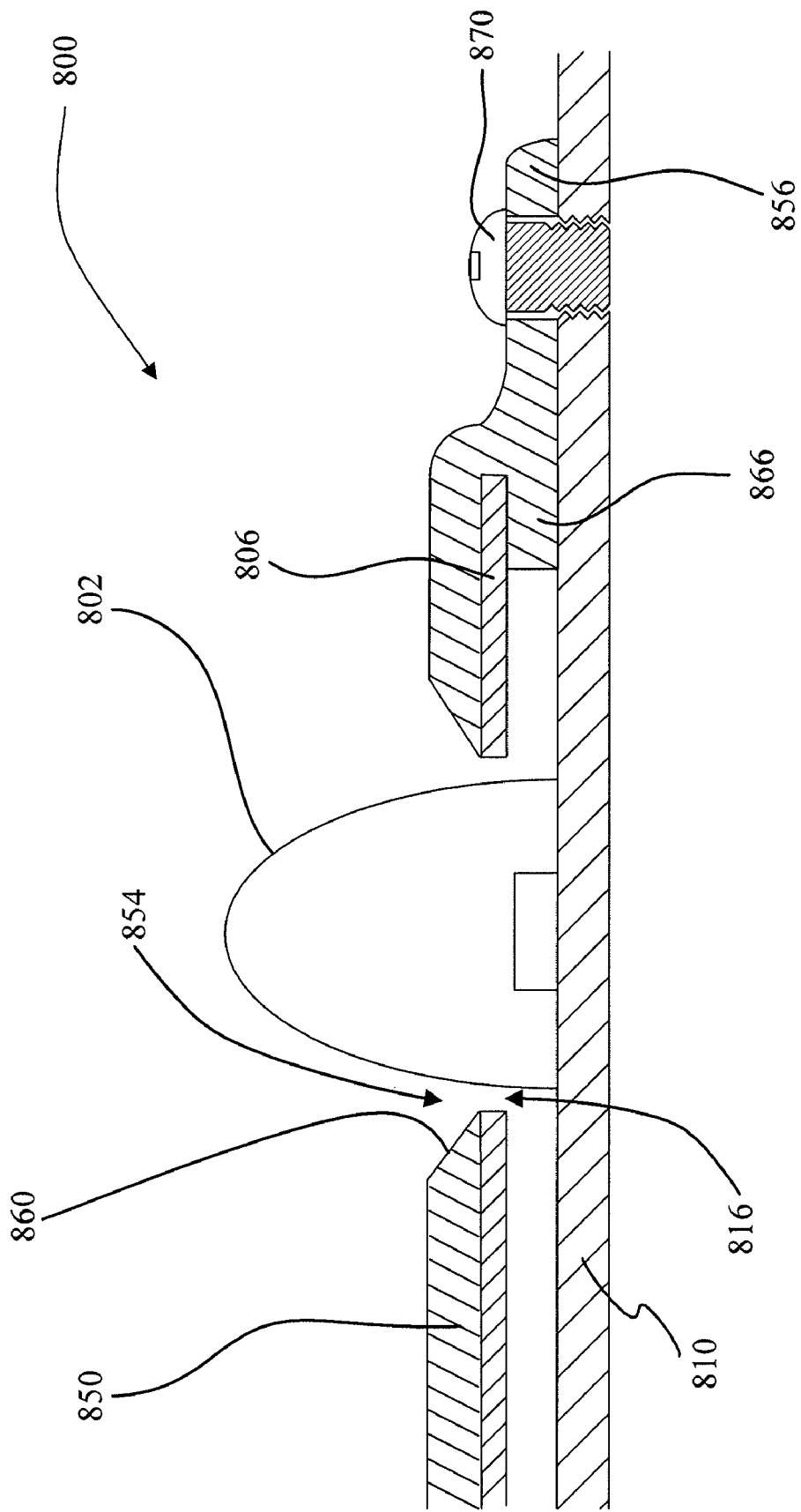
FIG. 12 is a cross section of a portion of a light source comprising a photosensor light guide and light guide cover, in accordance with another embodiment of the present invention.

In order to reduce undesirable blocking of light coming from the light-emitting element and directed toward the output of the light source, the thickness of the cover can be reduced, and in particular, can be further reduced when approaching each light-emitting element (e.g. see embodiments of FIGS. 11 and 12). For example, in one embodiment the cover tapers towards the light-emitting elements, such that its thickness reduces to a knife-edge close to the light-emitting elements.

Furthermore, in some embodiments, the light guide cover is configured to act as a mounting and/or positioning device for the light guide. In such embodiments, the light guide cover is coupled both to the light guide and the light-emitting element substrate (e.g. see the embodiment of FIG. 12) and/or the light source housing (e.g. see the embodiment of FIG. 11). These couplings can be achieved in various different ways using various clips, fasteners, adhesives and the like, as will be apparent to a person of skill in the art (e.g. see embodiments of FIGS. 9 through 12).

The invention will now be described with reference to specific examples. It will be understood that the following examples are intended to describe embodiments of the invention and are not intended to limit the invention in any way.

EXAMPLES

Example 1

Figure 2:
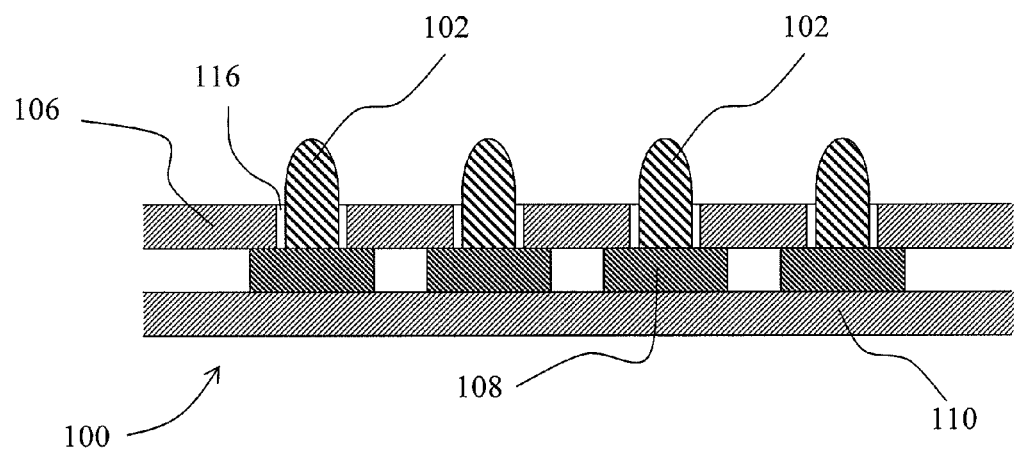
FIG. 2 is a cross section of FIG. 1 taken along line 2-2 thereof.
Figure 3:
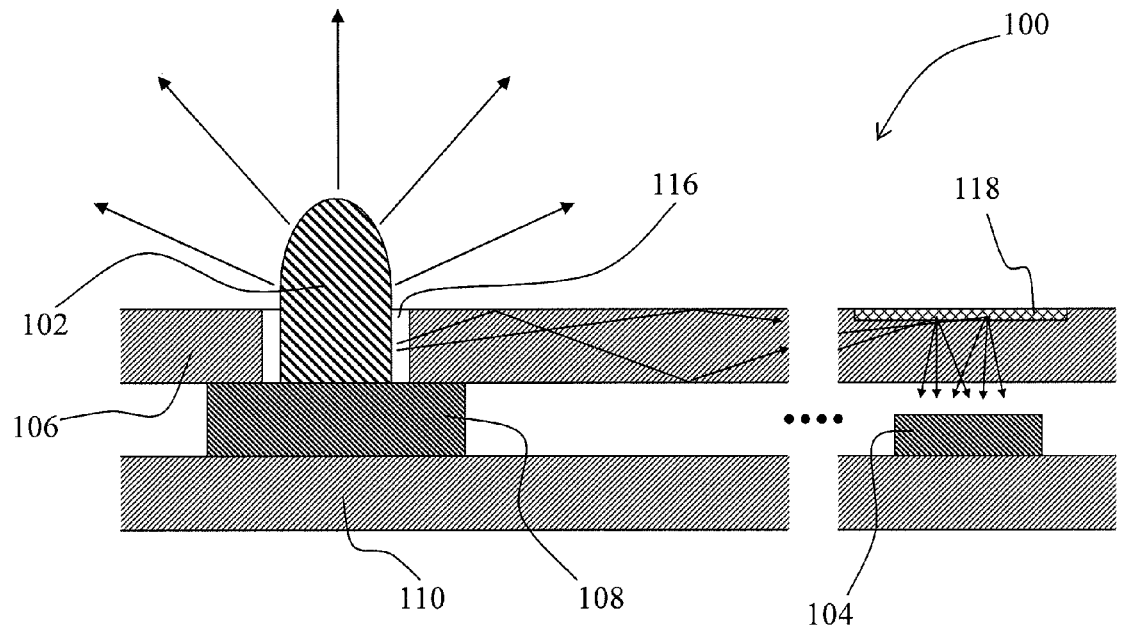
FIG. 3 is a magnified cross section of FIG. 1 taken along line 3-3 thereof.

With reference now to FIGS. 1 to 3, a light source, generally referred to using the numeral 100, and in accordance with one embodiment of the present invention, will now be described. The light source 100 generally comprises four linearly disposed light-emitting elements, as in light-emitting element 102, a photosensor 104, and a substantially planar light guide 106 for capturing, mixing and guiding a fraction of the light radially emitted by the light-emitting elements 102 toward the photosensor 104. In this example, the light source 100 is generally comprised of a red, an amber, a green and a blue light-emitting element 102 configured to emit light in accordance with predefined output intensities that provide a desired combined output, such as a desired output colour level (e.g., chromaticity, colour temperature, etc.), a desired white light level (e.g., having a desired colour rendering index, colour quality, etc.), or the like.

In general, each light-emitting element 102 is mounted to a substrate 108, which is itself operatively coupled to a printed circuit board (PCB) 110. Light-emitting element drivers, as in driver 112, are configured to provide drive signals to the PCB 110 in order to respectively drive each of the light-emitting elements 102. The photosensor 104 is also generally mounted to PCB 110 and configured to communicate monitoring signals to an output control means 114, such as a signal processor of a feedback control system or the like (e.g., a data processor, microprocessor, software and or hardware device, etc.), which is itself configured to control the drivers 112 to generate drive signals conducive to providing and/or substantially maintaining the desired light source output. By monitoring the outputs of the light-emitting elements 102 via light guide 106 and photosensor 104, the respective outputs of the light-emitting elements 102 may be adjusted as needed, via control means 114 and drivers 112, to accommodate a relative change in the respective outputs of the light-emitting elements 102 caused by ambient and/or operating temperature changes, an ageing of the light-emitting elements 102, modification of the overall output intensity, and/or other such parameters readily understood by the worker skilled in the art.

In this embodiment, the substantially planar light guide 106 is generally shaped and sized such that a perimeter thereof encompasses the four light-emitting elements 102 and the photosensor 104. Respective apertures, as in circular hole 116, positioned to correspond and be aligned with the positions of the four light-emitting elements 102, are provided in the light guide 106, the apertures 116 being sufficiently large to fit over the optics of the respective light-emitting elements 102. As such, when the light guide is positioned over the light-emitting elements 102, an inner edge of the apertures 116 thereby defines respective in-coupling edge portions for in-coupling light emitted radially or sideways from the respective light-emitting elements 102, while a substantially forward emission thereof remains substantially unobstructed by the light guide 106 (e.g., see FIG. 3).

In one embodiment, the light guide 106 comprises an acrylic plate that is thin enough that it does not diminish the forward emitted light from the light-emitting elements 102. In particular, it may be positioned, as described above, such that it captures the stray, sideways emitted light which would not normally be part of the useful output of the light source. In one embodiment, the acrylic plate is about 0.040" thick.

Furthermore, the light guide 106 generally comprises an out-coupling surface portion 118 positioned to be aligned with the an input of the photosensor 104. As such, at least some of the light captured from the light-emitting elements 102 may be mixed and guided by the light guide 106 to the out-coupling surface portion 118 where it may be extracted and sensed by the photosensor 104 (e.g., see FIG. 3).

In general, the out-coupling surface portion 118 comprises, for example, a roughened, textured, machined and/or imprinted surface configured to act as a diffuser for out-coupling light interacting with this surface and directing at least some of it toward the photosensor 104. In this embodiment, this surface portion is illustratively provided on a surface of the light guide 106 facing the photosensor and opposite to a general output direction of the light source.

Consequently, radially and/or sideways emitted light from the light-emitting elements 102, such as stray light and/or other radially or sideways emitted light components, may be mixed and guided within the light guide 106. Ultimately, a portion of the mixed and guided light is sensed by photosensor 104, which may used by a control means 114 operatively coupled thereto, to assess an overall output of the light source 100 and adjust, when needed to maintain a desired output, the respective outputs of the light-emitting elements 102.

Example 2

Figure 4:
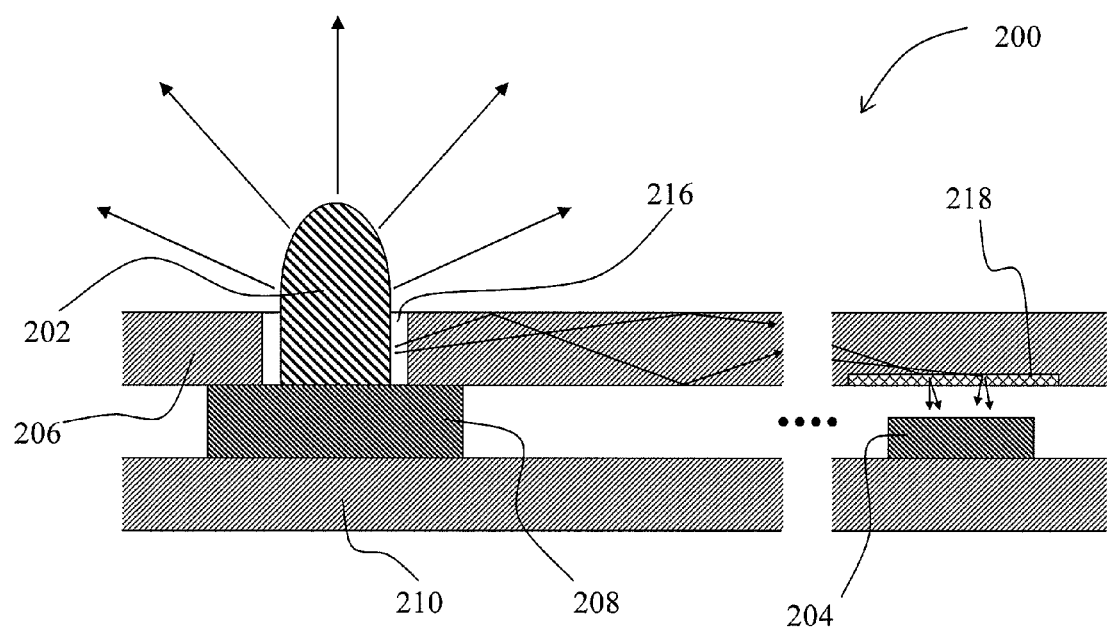
FIG. 4 is a magnified cross sectional view of a light source comprising a photosensor light guide, in accordance with another embodiment of the present invention.

With reference now to FIG. 4, a light source, generally referred to using the numeral 200, and in accordance with another embodiment of the present invention, will now be described. The light source 200 is similar to the light source 100 of FIGS. 1 to 3, differing in that an out-coupling surface portion 218 of the light guide 206 is positioned on an inner surface thereof that is proximal to the photosensor 204, rather than be positioned on an outer surface of the light guide 206, as is the case for out-coupling surface portion 118 of the embodiment of FIGS. 1 to 3. Other parts illustrated in FIG. 4 that are similar to corresponding parts illustrated in the embodiment of FIGS. 1 to 3, are numbered using corresponding numbers for completeness.

Example 3

Figure 5:
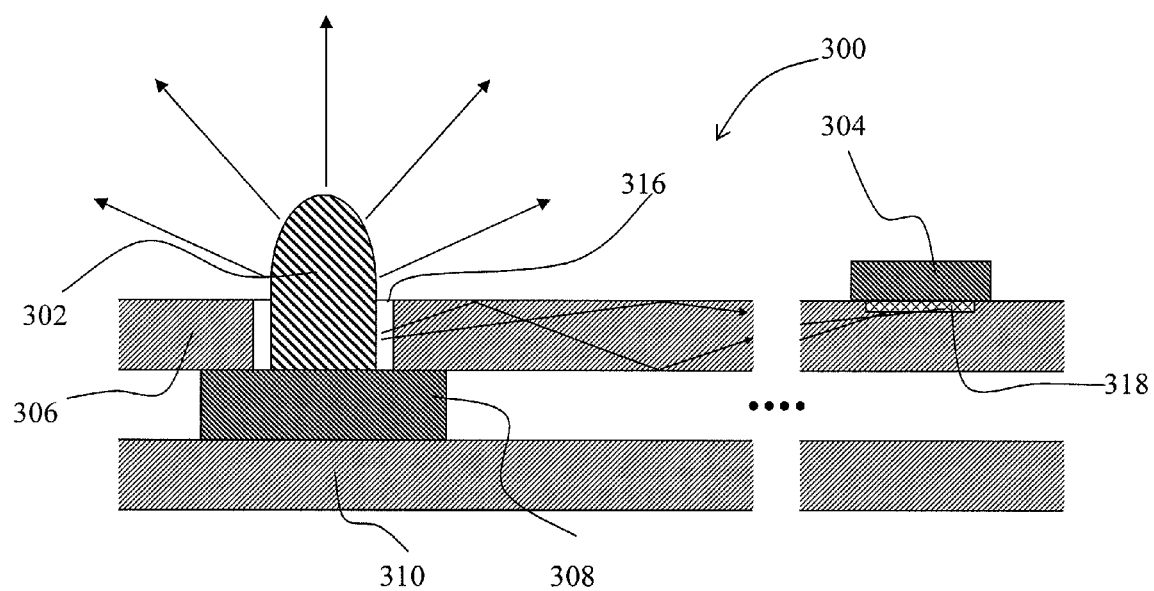
FIG. 5 is a magnified cross sectional view of a light source comprising a photosensor light guide, in accordance with another embodiment of the present invention.

With reference now to FIG. 5, a light source, generally referred to using the numeral 300, and in accordance with another embodiment of the present invention, will now be described. The light source 300 is similar to the light source 100 of FIGS. 1 to 3, differing in that the photosensor 304 is positioned on the outer surface of the light guide 306, on the same side as the out-coupling surface portion 318. Other parts illustrated in FIG. 5 that are similar to corresponding parts illustrated in the embodiment of FIGS. 1 to 3, are numbered using corresponding numbers for completeness.

Example 4

Figure 6:
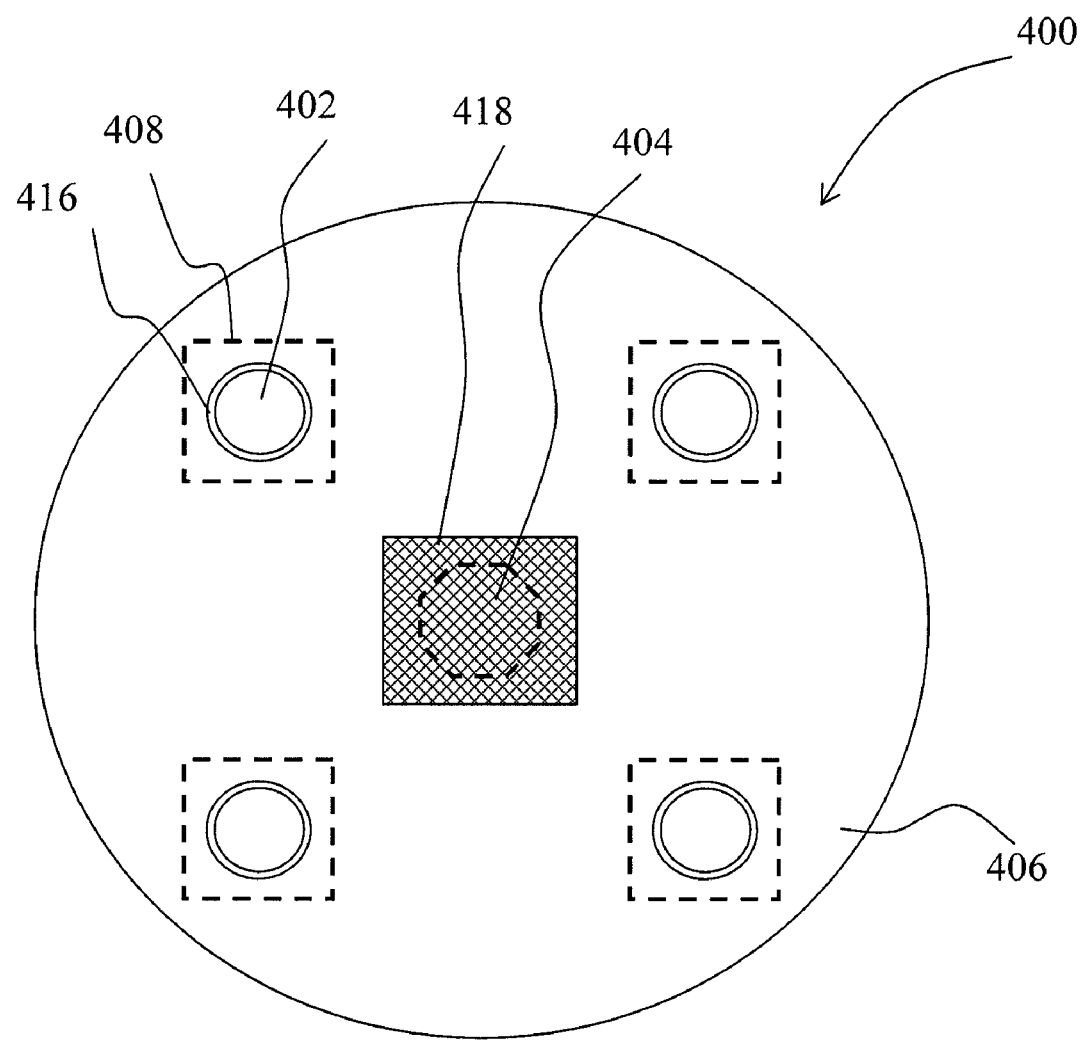
FIG. 6 is a top plan view of a light source comprising a photosensor light guide, in accordance with another embodiment of the present invention.

With reference now to FIG. 6, a light source, generally referred to using the numeral 400, and in accordance with another embodiment of the present invention, will now be described. The light source 400 is similar to the light source 100 of FIGS. 1 to 3, differing only in that the light source's four light emitting elements 402 are symmetrically disposed around the photosensor 404 in a square configuration within a substantially circular light guide 406. Other parts illustrated in FIG. 6 that are similar to corresponding parts illustrated in the embodiment of FIGS. 1 to 3, are numbered using corresponding numbers for completeness.

Example 5

Figure 7:
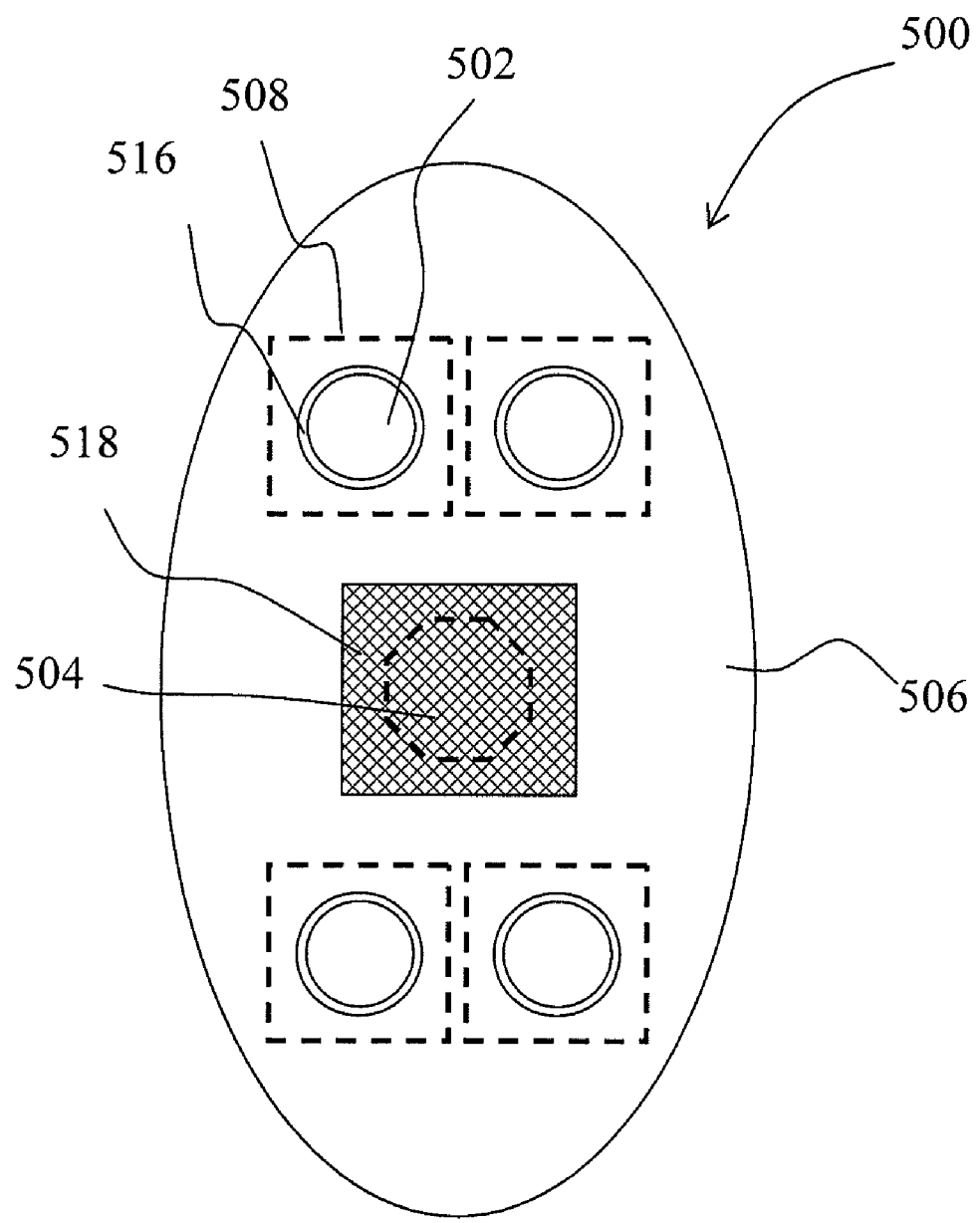
FIG. 7 is a top plan view of a light source comprising a photosensor light guide, in accordance with another embodiment of the present invention.

With reference now to FIG. 7, a light source, generally referred to using the numeral 500, and in accordance with another embodiment of the present invention, will now be described. The light source 500 is similar to the light source 100 of FIGS. 1 to 3, differing only in that the light source's four light emitting elements 502 are symmetrically disposed around the photosensor 504 in a paired, substantially rectangular configuration within a substantially oval light guide 506. Other parts illustrated in FIG. 7 that are similar to corresponding parts illustrated in the embodiment of FIGS. 1 to 3, are numbered using corresponding numbers for completeness.

Example 6

Figure 8:
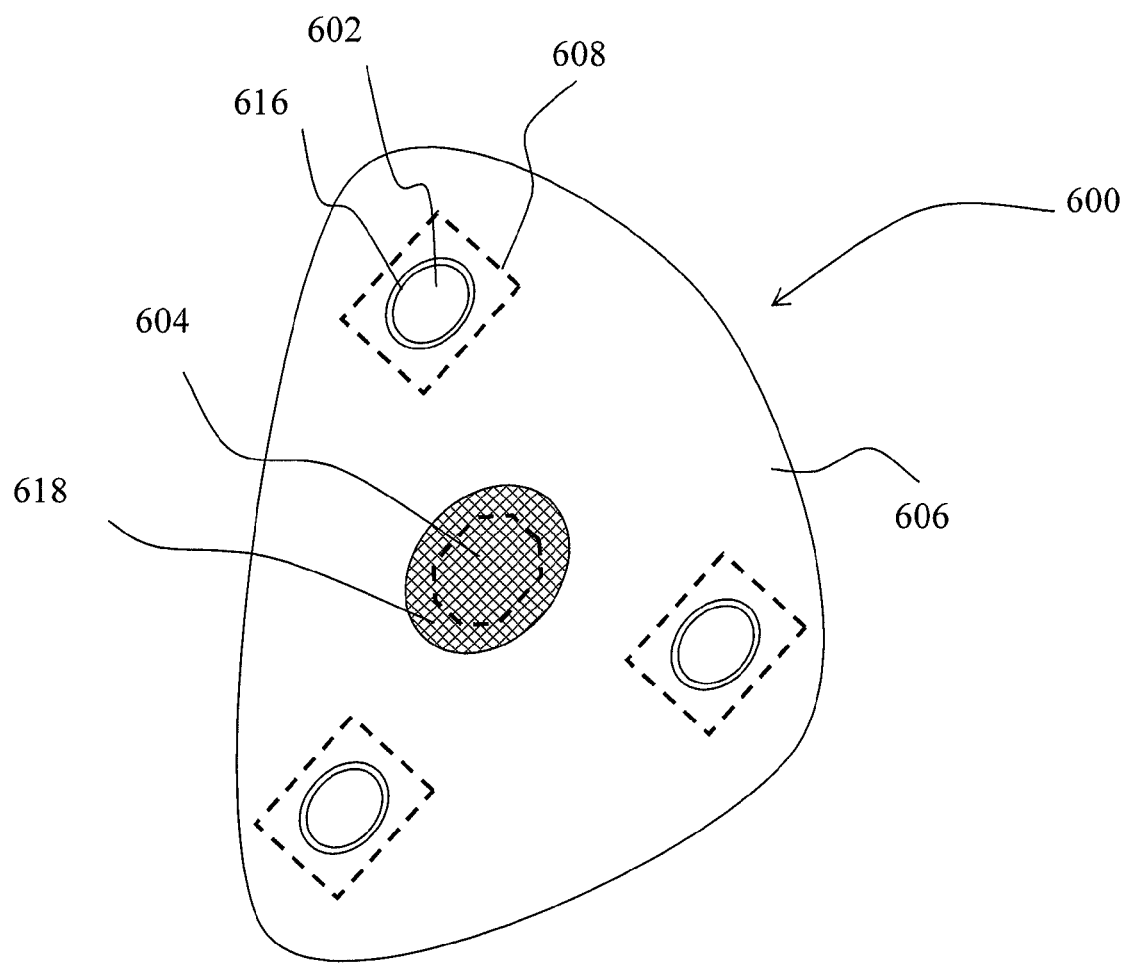
FIG. 8 is a top plan view of a light source comprising a photosensor light guide, in accordance with another embodiment of the present invention.

With reference now to FIG. 8, a light source, generally referred to using the numeral 600, and in accordance with another embodiment of the present invention, will now be described. The light source 600 is similar to the light source 100 of FIGS. 1 to 3, differing only in that the light source 600 comprises only three light emitting elements 602, for example comprising a red, a green and a blue light-emitting element 602, disposed around the photosensor 604 in a roughly triangular configuration within a roughly triangular light guide 606. Other parts illustrated in FIG. 8 that are similar to corresponding parts illustrated in the embodiment of FIGS. 1 to 3, are numbered using corresponding numbers for completeness.

Example 7

Figure 9:
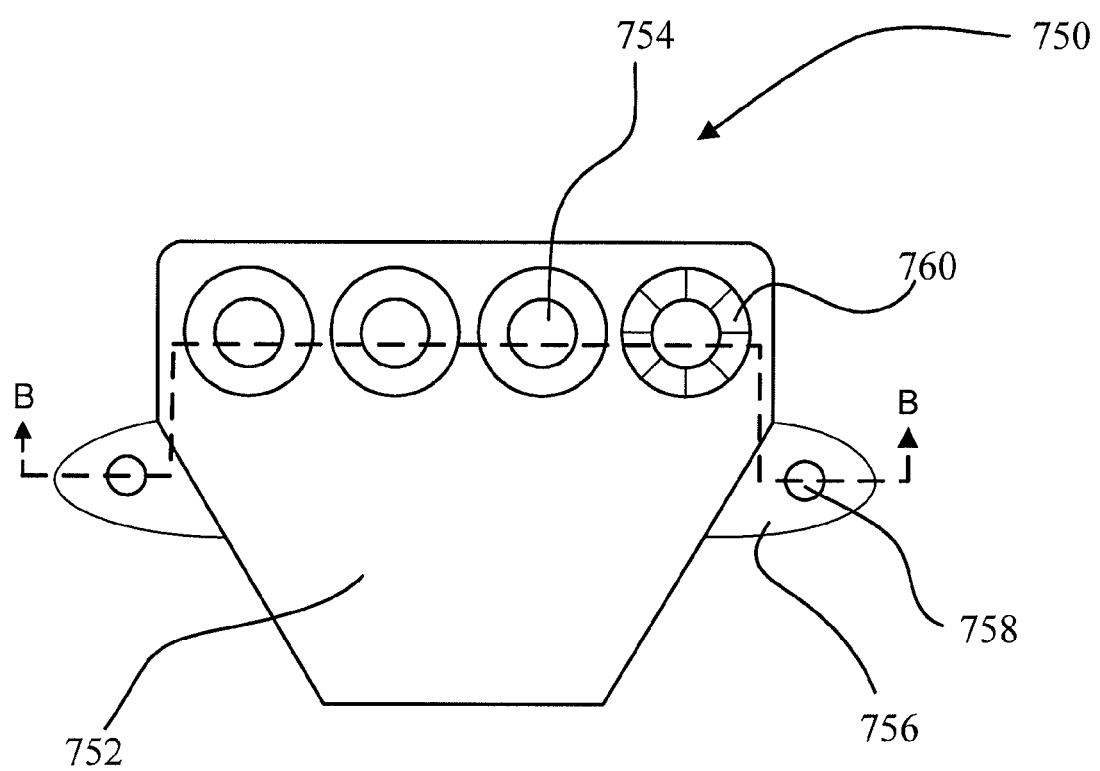
FIG. 9 is a top plan view of a light guide cover for use with a light source comprising a photosensor light guide, in accordance with another embodiment of the present invention.
Figure 10:
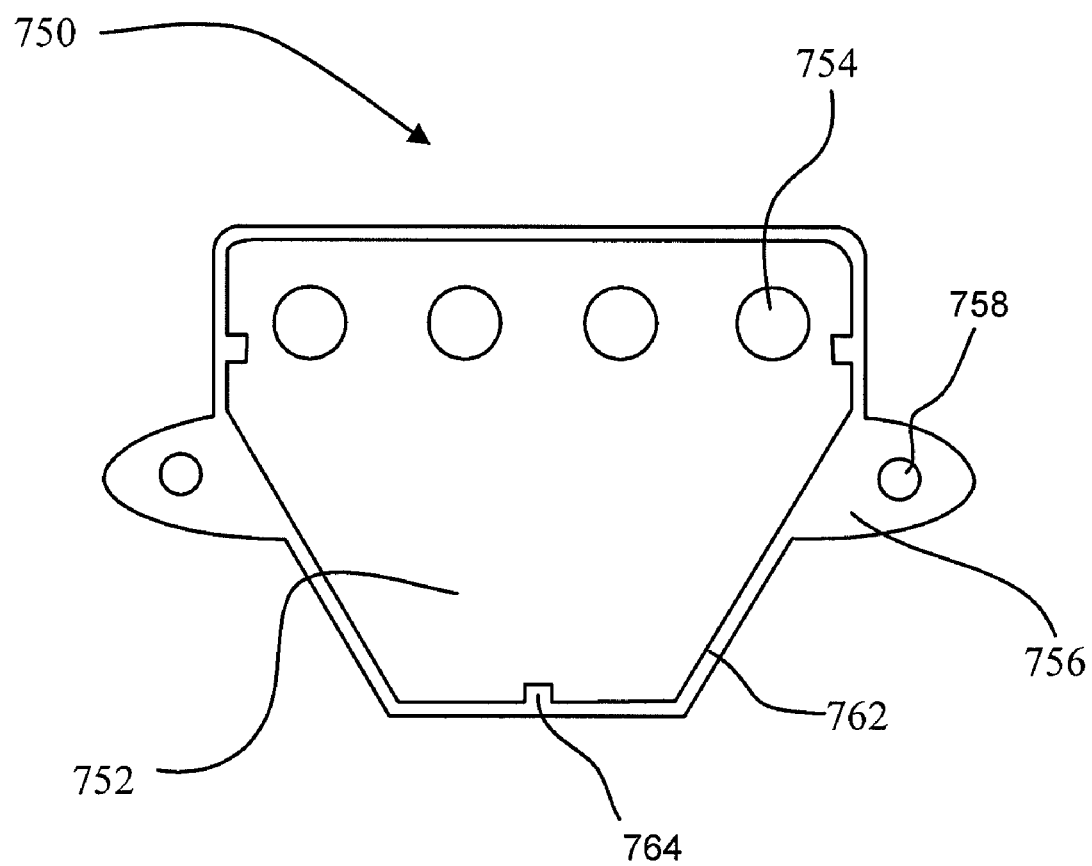
FIG. 10 is a bottom plan view of the light guide cover of FIG. 9.

With reference now to FIGS. 9 to 11, in accordance with another embodiment of the present invention, a light source 700 (see FIG. 11) comprising an optional light guide cover 750 will now be described. The light source 700 is similar to the light source 100 of FIGS. 1 to 3, comprising a number of light emitting elements 102 operatively coupled to a substrate 710 and disposed to protrude from respective holes 716 of a light guide 706, each one of which providing an in-coupling portion for receiving light from the light-emitting elements 702 and guiding same toward a photosensor (not shown).

In this example, the light source 700 further comprises a light guide cover 750 to be disposed over the light guide 706 to reduce penetration of ambient light therein and/or reduce undesired extraction of in-coupled light therefrom. The light guide cover 750 comprises a number of holes, such as hole 754, for light-emitting elements 702 to pass through, and mounting structures 756 each comprising a mounting aperture 758 for mounting same to the light source housing (now shown), for example, via an appropriate fastener or the like, as will be apparent to the person of skill in the art.

The light guide cover 750 further comprises light guide coupling elements, such as clips 766 provided to hold the light guide 706 in place in a distanced relation to the cover 750, and consequently, in relation to the light source housing and light-emitting elements 702. Additionally, the clips 766 and side wall portion 762 are configured to hold the light-emitting element substrate 710 in place. Alignment elements, such as tab 764, may also be provided, as illustrated herein, on the side wall portion 762 of the cover 750 to assist in positioning the light guide 706 relative thereto. In this example, the tabs 764 comprise indents on the bottom surface of the cover 750. It would be clear to a person of skill in the art that such alignment elements can have various configurations and shapes, including, for example, tabs that extend through the thickness of the cover, or again recesses configured to receive therein protrusions extending from the light guide, for example. Other such alignment means should be apparent to the person of skill in the art and are thus not considered to depart from the general scope and nature of the present disclosure.

The thickness of the cover 750 in this example is reduced near the light-emitting element holes 754 so to reduce obstruction of light emitted by the light-emitting elements 702 directed toward an output of the light source 700. For instance, the top surface of the cover 750 comprises a bevelled region 760 near the light emitting element holes 754 which is bevelled towards the bottom surface, such that the thickness of the cover 750 thereat is decreased to reduce obstruction of emitted light. The bevelled surface of this region 760 may be reflective, in one example, to redirect light emitted by the light-emitting elements 702 that is incident thereupon.

Example 8

With reference now to FIG. 12, a light source, generally referred to using the numeral 800, and in accordance with another embodiment of the present invention, will now be described. The light source 800 is similar to the light source 100 of FIGS. 1 to 3, comprising one or more light-emitting elements 802 operatively coupled to a substrate 810 and disposed to protrude from respective holes 816 of a light guide 806, each one of which providing an in-coupling portion for receiving light from a respective light-emitting element 802 and guiding same toward a photosensor (not shown).

In this example, the light source 800 further comprises a light guide cover 850 which comprises one or more mounting structures 856 having respective mounting holes, for mounting same to the substrate 810, such as a printed circuit board or the like, via an appropriate fastener 870, as will be apparent to the person of skill in the art.

The cover 850 also comprises a light guide coupling elements, such as clip 866, or the like, for coupling to the light guide 806 thereto and positioning same in a pre-set configuration. In this example, the surface of the cover 850 facing the light guide 806 and with which it is in direct contact, is provided with a reflective coating (not shown), thereby reducing unwanted extraction of light from the light guide 806.

The thickness of the cover 850 in this example is again reduced near respective light-emitting element holes 854 so to reduce obstruction of light emitted by the light-emitting element 802 directed toward an output of the light source 800. For instance, the top surface of the cover 850 comprises a bevelled region 860 near the light emitting element holes 854 which is bevelled towards the bottom surface, such that the thickness of the cover 850 thereat is decreased to reduce obstruction of emitted light. The bevelled surface of this region 860 may be reflective, in one example, to redirect light emitted by the light-emitting element 802 that is incident thereupon.

Example 9

With reference now to FIG. 13, a light source, generally referred to using the numeral 900, and in accordance with another embodiment of the present invention, will now be described. The light source 900 is similar to the light source 100 of FIGS. 1 to 3, comprising one or more light-emitting elements 902 operatively coupled to a substrate 910 and disposed to protrude from respective holes 916 of a light guide 906, each one of which providing an in-coupling portion for receiving light from a respective light-emitting element 902 and guiding same toward a photosensor (not shown).

In this example, the light source 900 further comprises a light guide cover 950 provided by one or more layered coatings disposed on the light guide 906. For instance, the light guide 906 comprises a reflective coating 980 and an additional opaque coating 990 thereon to aid in further reducing ambient light from entering the light guide and/or reduce extraction of in-coupled light therefrom.

It is apparent that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A light source comprising:
   a substantially planar light guide comprising one or more in-coupling portions and one or more out-coupling portions;
   one or more light-emitting elements, each configured to emit light about a respective optical axis and disposed such that an axial component thereof is at least partially directed toward the output of the light source and such that a radial component thereof is at least partially coupled into said substantially planar light guide via said one or more in-coupling portions; and
   one or more photosensors optically coupled to said one or more out-coupling portions for use in controlling the output of each of said one or more light-emitting elements based on out-coupled light sensed thereby, wherein at least one of said one or more in-coupling portions comprises an in-coupling edge portion, said in-coupling edge portion at least partially circumscribing at least one of said light-emitting elements.

2. The light source as claimed in claim 1, wherein said in-coupling edge portion defines an aperture through which one or more of said one or more light-emitting elements are at least partially disposed.

3. The light source as claimed in claim 1, wherein each of said one or more in-coupling portions comprises an in-coupling edge portion defining an aperture within said substantially planar light guide through which a respective one of said one or more light-emitting elements are at least partially disposed.

4. The light source as claimed in claim 1 comprising two or more light-emitting elements each comprising a respective emission spectrum for providing a combined light source output, said one or more photosensors for use in controlling a relative output of said two or more light-emitting elements for substantially maintaining said combined light source output.

5. The light source as claimed in claim 4, wherein said combined light source output is substantially white light.

6. The light source as claimed in claim 4, said two or more light emitting elements comprising one or more of each of red, green, amber and blue light-emitting elements.

7. The light source as claimed in claim 1, further comprising an output controller operatively coupled to said one or more photosensors and configured to drive said one or more light-emitting elements as a function of said out-coupled light sensed thereby.

8. The light source as claimed in claim 1, wherein said one or more out-coupling portions comprise an out-coupling surface portion.

9. The light source as claimed in claim 8, wherein said out-coupling surface portion comprises a textured surface portion.

10. The light source as claimed in claim 1, wherein said radial component comprises stray light.

11. The light source as claimed in claim 1, wherein said radial component is at most secondary to said axial component.

12. The light source as claimed in claim 1, wherein said light guide is shaped to provide a substantially parabolic edge and wherein one or more of said one or more out-coupling portions are disposed about a focal point of said parabolic edge.

13. The light source as claimed in claim 1, wherein said light guide comprises two or more in-coupling portions disposed substantially symmetrically about a single out-coupling portion.

14. The light source as claimed in claim 1, further comprising a light guide cover for at least partially blocking ambient light from penetrating said light guide.

15. The light source as claimed in claim 14, wherein said light guide cover comprises one or more light guide coupling elements for coupling said light guide thereto and thereby positioning same relative thereto.

16. The light source as claimed in claim 14, said light guide cover comprising a reflective coating to substantially maintain internal reflection within said light guide.

17. The light source as claimed in claim 16, wherein said reflective coating is disposed on a surface of said light guide.

18. The light source as claimed in claim 17, said light guide cover further comprising a substantially opaque coating disposed atop said reflective coating to further reduce penetration of ambient into said light guide.

19. A light source comprising:
one or more light-emitting elements;
a substantially planar light guide comprising one or more in-coupling portions and one or more out-coupling portions, said substantially planar light guide being configured to capture stray light emitted from said one or more light-emitting elements via said one or more in-coupling portions; and
one or more photosensors optically coupled to said one or more out-coupling portions for use in controlling the output of each of said one or more light-emitting elements based on out-coupled light sensed thereby, wherein each of said in-coupling portions comprises an in-coupling edge portion defining an aperture within said substantially planar light guide through which a respective one of said one or more light-emitting elements is at least partially disposed.

20. The light source as claimed in claim 19, wherein said in-coupling portion comprises an in-coupling edge portion.

21. The light source as claimed in claim 19, wherein said stray light comprises a radial component of the light emitted by said one or more light-emitting elements.

22. The light source as claimed in claim 21, wherein said radial component is at most secondary relative to a predominant axial component of the light emitted by said one or more light-emitting elements.

23. The light source as claimed in claim 19, further comprising an output controller operatively coupled to said one or more photosensors and configured to drive said one or more light-emitting elements as a function of said out-coupled light sensed thereby.

24. The light source as claimed in claim 19 comprising two or more light-emitting elements each configured to emit light at a respective wavelength for providing a combined light source output, said one or more photosensors for use in controlling a relative output of said two or more light-emitting elements for substantially maintaining said combined light source output.

* * * * *